US006658699B2

(12) United States Patent
Huong

(10) Patent No.: US 6,658,699 B2
(45) Date of Patent: Dec. 9, 2003

(54) ROTATING SHAFT ASSEMBLY

(75) Inventor: Chin-Fu Huong, Panchiao (TW)

(73) Assignee: Hinge Basestrong Co., Ltd., Taipei Hsien (TW)

( * ) Notice: Subject to any disclaimer, the term of this patent is extended or adjusted under 35 U.S.C. 154(b) by 4 days.

(21) Appl. No.: 10/040,626

(22) Filed: Jan. 9, 2002

(65) Prior Publication Data

US 2003/0014840 A1 Jan. 23, 2003

(30) Foreign Application Priority Data

Jul. 17, 2001 (TW) ...................................... 90212041 U

(51) Int. Cl.[7] ............................................... E05D 11/10

(52) U.S. Cl. ............................ 16/330; 16/327; 16/334; 16/329; 379/433.13; 379/433

(58) Field of Search .......................... 16/330, 328, 329, 16/327, 303, 342, 334; 455/90; 379/433.13, 428

(56) References Cited

U.S. PATENT DOCUMENTS 5,628,089 A * 5/1997 Wilcox et al. ................ 16/303
5,937,062 A * 8/1999 Sun et al. .............. 379/433.13
5,966,776 A * 10/1999 Ona ............................ 16/328
5,970,819 A * 10/1999 Katoh ......................... 74/531
5,996,179 A * 12/1999 Huong ........................ 16/330
6,148,079 A * 11/2000 Chintala et al. ....... 379/433.13
6,175,990 B1 * 1/2001 Kato et al. .................... 16/334
6,459,887 B2 * 10/2002 Okuda ......................... 455/90

* cited by examiner

*Primary Examiner*—Lynne H. Browne
*Assistant Examiner*—Mark Williams
(74) *Attorney, Agent, or Firm*—Troxell Law Office PLLC

(57) ABSTRACT

A rotating shaft with open and shut function comprises a shaft part, a fixing part, a slide part, an extension part and/or a rotating part. When a lid on an article rotates, the rotating slants of the rotating projections on the rotating part move along the end projections of the slide part to allow the sliding juts on the slide part moving along the fixing juts on the fixing part so as to compress the extension part between the fixing part and the slide part. When the lid rotates an angle till the rotating projections contacting face to face with the end projections, the lid can be located in a state of standstill. When rotating slants move to the slant side of the respective end projection at the another side thereof, the extension part stretches to allow the slide part moving back axially so that the rotating slants can move along the end slants to form a state of engagement between the rotating slants and the end slants respectively and the lid can be fully opened automatically.

5 Claims, 5 Drawing Sheets

62 53 521 44 45 43 63 61 6 5 51 52 441 41 4 42 3 23 22 24 25 1 71 2 21 7

ROTATING SHAFT ASSEMBLY

BACKGROUND OF THE INVENTION

1. Field of the Invention

The present invention relates to a rotating shaft assembly, and, more particularly to a rotating shaft assembly, which provides a function to open an article in a specific angular position and to shut the article, automatically.

2. Description of Related Art

A lifted lid on a consumptive electronic product such as a mobile phone, a personal digital assistant (PDA) or the like is usually for covering the keyboard or the screen to avoid the keyboard being carelessly touched or to protect the screen.

Taking the mobile phone with lifted lid or slide lid available in the market as an example, the lid has to be lifted completely or pushed away before the keyboard being operated. The lid is mounted to a main unit of the mobile phone at the lower edge thereof by way of shaft connection or insert joint so that the lid can be opened and shut. However, it has some slight imperfection that the engagement between the lid and main unit may become loose after using a period of time. Thus, in order to avoid the defective, most of the mobile phones or PDA currently used have not adopted the lids. But, it frequently results in that the keyboard is carelessly touched or the screen is damaged. Hence, it is a difficult problem to be overcome that the lid can be operated repeatedly without occurring the phenomenon of loosening in addition to having an effect of standstill.

The present inventor has endeavored the research and development of a rotating shaft for many years and has been granted the U.S. Pat. No. 5,996,179 and the present invention is a newly developed rotating shaft assembly with open and shut function for overcoming the shortcoming resided in the prior art.

SUMMARY OF THE INVENTION

An object of the present invention is to provide a rotating shaft assembly, which comprises a shaft part, a fixing part, a slide part, an extension part and/or a rotating part. When a lid on an article rotates, the rotating slants of the rotating projections on the rotating part move along the end projections of the slide part to allow the sliding juts on the slide part moving along the fixing juts on the fixing part so as to compress the extension part between the fixing part and the slide part. When the lid rotates an angle till the rotating projections contacting face to face with the end projections, the lid can be located in a state of standstill. When rotating slants move to the slant side of the respective end projection at the another side thereof, the extension part stretches to allow the slide part moving back axially so that the rotating slants can move along the end slants to form a state of engagement between the rotating slants and the end slants respectively and the lid can be fully opened automatically.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
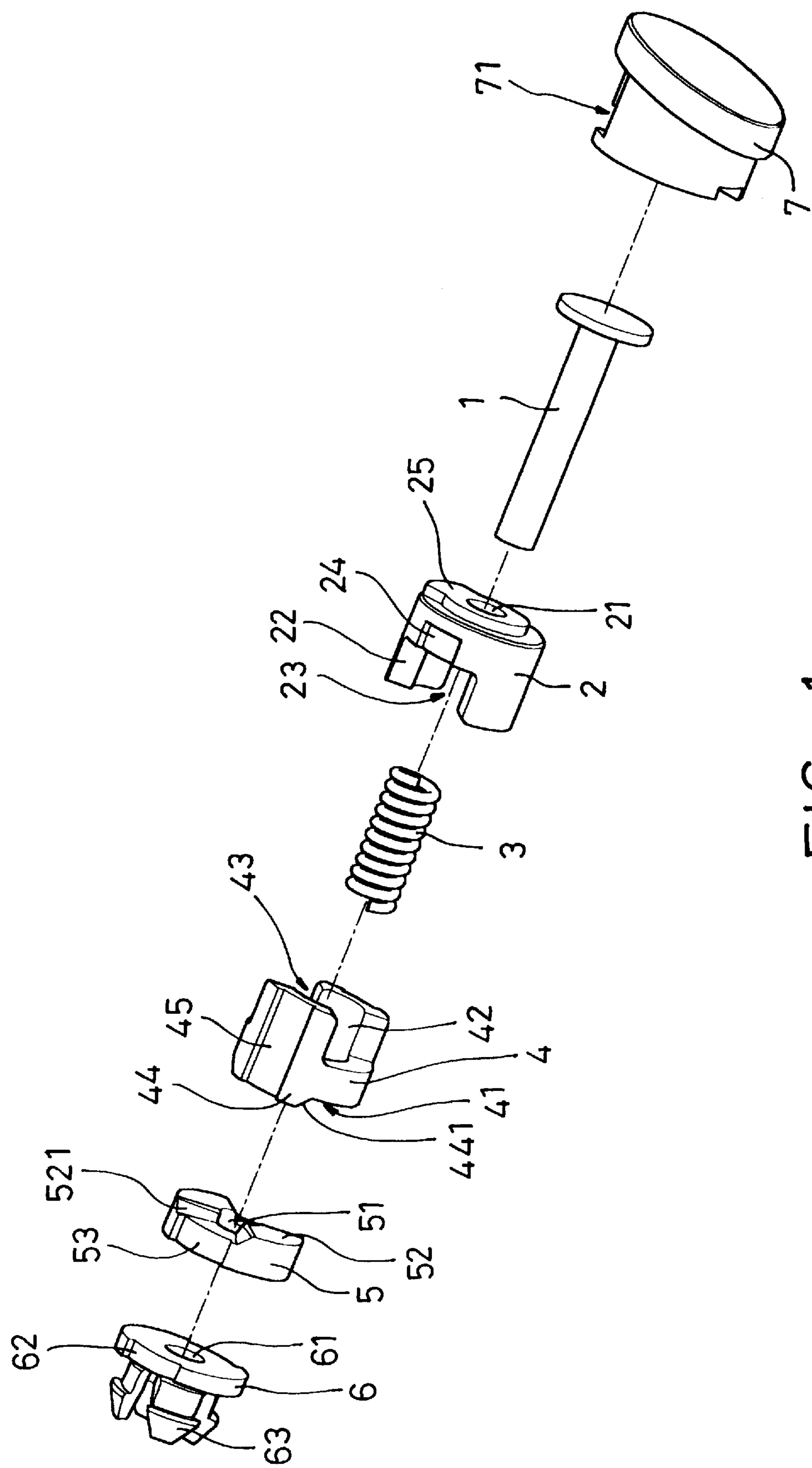
FIG. 1 is an exploded perspective view of a rotating shaft assembly according to the present invention.
Figure 2:
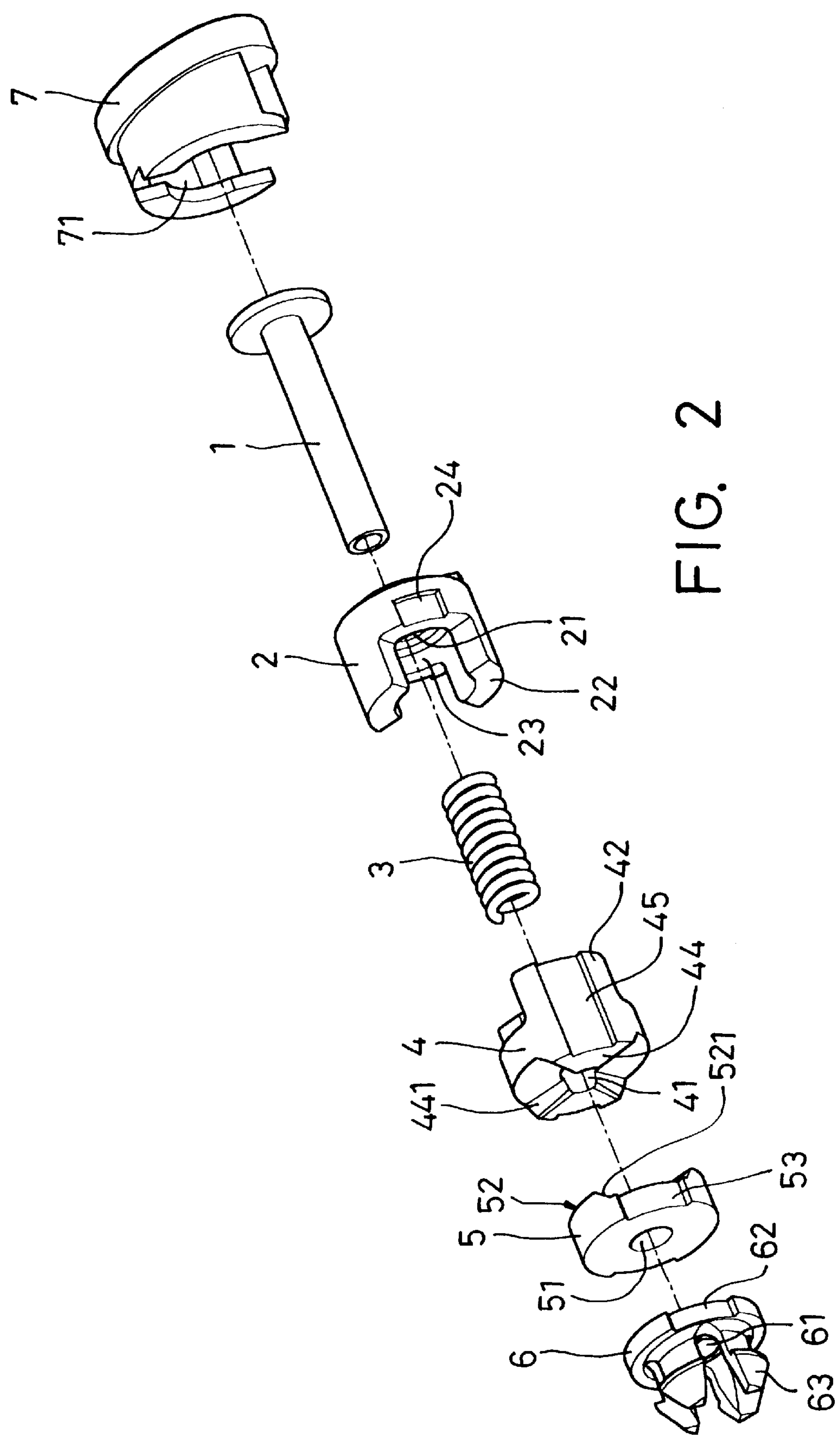
FIG. 2 is another exploded perspective view of a rotating shaft assembly according to the present invention with a different projection angle from FIG. 1.
Figure 3:
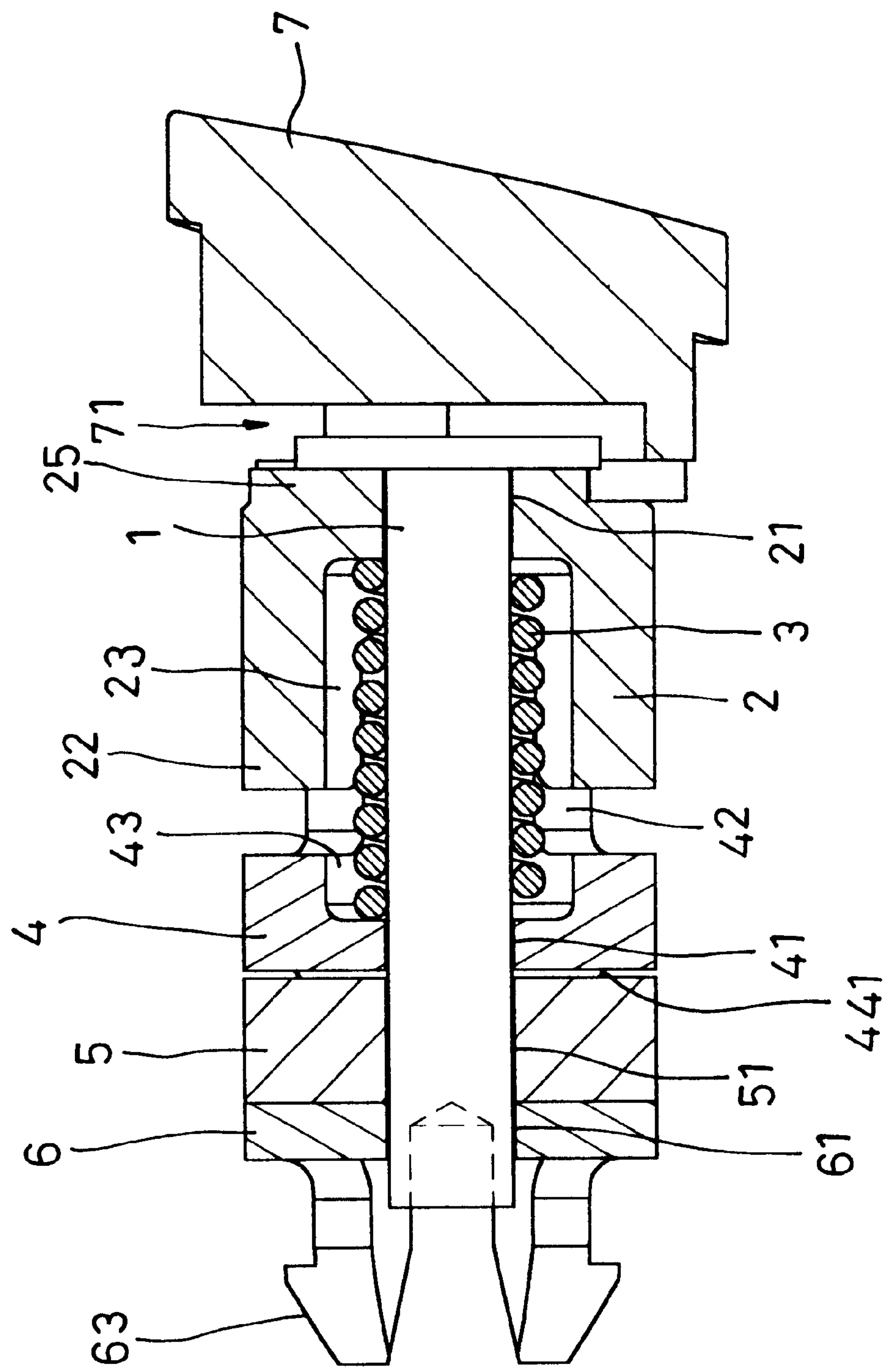
FIG. 3 is a sectional view of the rotating shaft assembly shown in FIGS. 1 and 2 after the parts being built up.

Referring to FIGS. 1 to 5, a rotating shaft assembly with open and shut function according to the present invention comprises a shaft part 1, a fixing part 2, an extension part 3, a slide part 4, a rotating part 5 and/or a connection part 6.

Wherein, the shaft part 1 is an elongated rod passing through other parts in the shaft assembly.

The fixing part 2 is annular with an axial hole 21 for being passed over by the shaft part 1 and two opposite fixing juts 22 extends from an end side of the fixing part 2 to form an extended chamber 23 for receiving the extension part 3. The fixing juts fit with the slide part 4. Besides, in order to engage with an article such as a main unit of a device, the fixing part 2 at the circumferential side thereof provides at least a fitting recess 24 to engage with the catch part of a connecting section arranged on the main unit (not shown). Further, another end side of the fixing part 2 has a fixing projection 25 surrounding the axial hole 21 to fit with a decoration part 7, which is used for hiding the shaft part 1 and enhancing a sense of beauty for the entirety of the rotating shaft assembly.

The extension part 3 is a resilient piece such as a spring and disposed between the slide part 4 and the fixing part 2 and received in the extended chamber 23 and an end chamber 43 of the slide part 4 for being passed over by the shaft part 1.

The slide part 4 is annular with a central sliding hole 41 being passed over by the shaft part 1 and two opposite sliding juts 42 extending from an end side thereof corresponding to two opposite spaces between the fixing juts 22. The end chamber 43 of the slide part 4 is formed due to the sliding juts 42. As soon as the fixing part 2 fits with the slide part 4, the sliding juts 42 are disposed next to the fixing juts 22 to form, for example, a shape of cylinder. Besides, another end side of the slide part 4 at the circumferential edge thereof extends two opposite edge projections 44 with two lateral sides of the respective edge projection 44 being a slant side 441. Further, at least a slide groove 45 is provided on the slide part 4 aligning with the fitting recess 24 for passing the catch part on the main unit during being mounted to the article. It is preferable that the sliding projections are sector shapes in practice.

The rotating part 5 is a ring piece with a central rotating hole 51 for being passed over by the shaft part 1 and the free end of the shaft part 1 is riveted to or screwed at the outer end side of the rotating part 5. The rotating part 5 at another end side thereof provides two rotating projections 52 corresponding to two spaces between the end projections 44 and each rotating part 5 at both lateral sides thereof is a rotating slant 521 respectively so that the rotating slants 521 can connect with the end slants 441 as soon as the rotating part 5 fits with the slide part 4. It means that the lid relative to the main unit is fully open or fully shut. Besides, the rotating part 5 at circumferential side thereof provides at east a rotating groove 53 corresponding to the sliding groove 45 for engaging with the engaging projection of the lid after passing through the catch part of the main unit so that the rotating part 5 can rotate along with the lid to perform the function of opening, closing and stagnation with the slide part 4. Besides, in order to connect the rotating part 5 with the lid firmly, the connection part 6 may be attached to the rotating part 5 with a central connecting hole 61 for being passed through by the shaft part 1. The shaft part 1 at the free end thereof can be fixed to the connecting part 6 as the preceding way for being fixed to the rotating part 5 does. A connecting recess 62 is provided on the connection part 6 corresponding to the rotating groove 53 to engage with the engaging projection of the lid so that the connection part 6 can move along with the rotating part 5. Further, the connection part 6 at the outer end side thereof provides a plurality of insert jaws 63 to be inserted into engaging holes (not shown) of the lid such that the rotating shat assembly will not detach from the lid and the main unit axially.

Furthermore, the projection area 25 on the fixing part 2 may engage with the decoration recess 71 in a decoration cover 7 as an enclosure for pleasing the eye.

Figure 4:
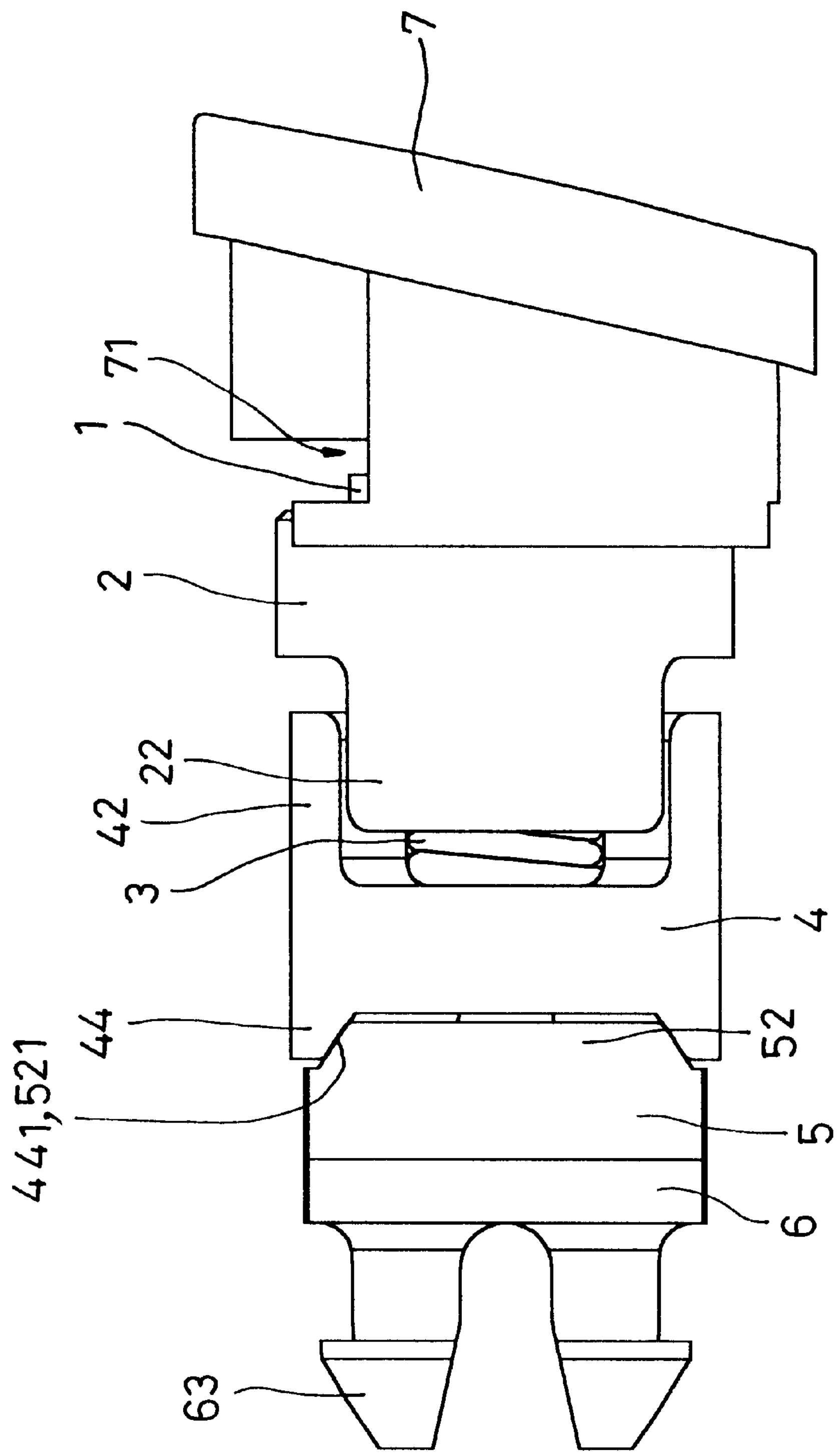
FIG. 4 is a front view of the rotating shaft assembly.
Figure 5:
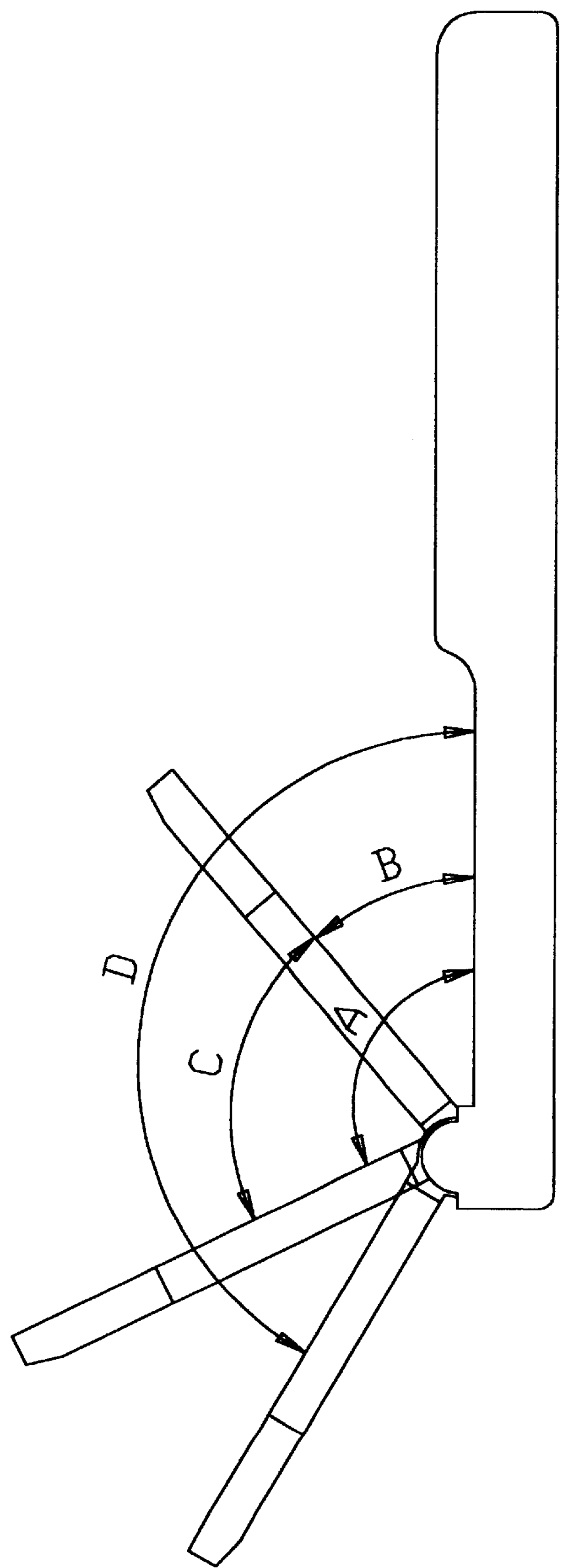
FIG. 5 is a plan view illustrating the rotating shaft assembly being mounted at a rear side of a cover on a article with different angular positions thereof during being opened.

Referring to FIGS. 4 and 5, as soon as the rotating shaft assembly of the present invention is built up, the shaft part is inserted into two connecting sections at both lateral sides of the main unit such that the connection part 6 and the rotating part 5 are received and located in a lid shaft between the connecting sections. This is the procedure for mounting the rotating shaft assembly of the present invention to the main unit and the lid. In case of the lid being opened, the only thing has to be done is to rotate the lid such that the rotating part 5 and the connection part 6 are subjected to the traction of the lid to rotate synchronously. Under this circumstance, the rotating slants 521 of the rotating projections 52 may move upward along the slant sides 441 of the end projections 44 to result in the sliding juts 42 of the slide part 4 move axially along the fixing juts 22 of the fixing part 2 so as to squeeze the extension part 3. As soon as the rotating slants 521 pass over the slant sides 441, the rotating projections 52 can contact face to face with the end projections 44 in a range of angle C as shown in FIG. 5. At this time, the lid can stay at any inclining angle to perform a function of standstill. In case of the lid being rotated further more, the rotating slants 521 can touch the end slants 441 at another sides of the end projections 44 at an angle A shown in FIG. A such that the rotating slants 521 can move downward along the end slants 441. At this time, the extension part 3 is in a state of stretching and the slide part 4 is actuated to move axially toward the rotating part 5 so as to fully open the lid. On the contrary, in case of the lid being closed, the only thing has to be done is to operate the lid inversely so as to move the rotating slants 521 to the initial end slants 411 at the angle B shown in FIG. 5. At this time, the rotating slants 521 of the slide part 4 can move downward along the slant sides 441 such that the lid can be shut automatically.

It is appreciated from the foregoing that the rotating shaft assembly according to the present invention, the lid can perform a function of opening and closing in a certain angle automatically and a function of standstill at a certain angle with facility. Besides, the rotating assembly of the present invention can be joined to the lid via a connecting section of the main unit on an article so that the rotating shaft assembly will not separate from lid axially. Further, a decoration part is offered to block the connecting section of the main unit for enhancing the function of decoration. These advantages of the present invention are not possible for the prior art to reach effectively.

While the invention has been described with reference to a preferred embodiment thereof, it is to be understood that modifications or variations may be easily made without departing from the spirit of this invention, which is defined in the appended claims.

What is claimed is:

1. A rotating shaft assembly, comprising:

a shaft part, being an elongated rod;

a fixing part having an axial fixing hole, at least two opposite fixing juts to form a fixing chamber, and at least one fitting recess for connecting to a main unit of an article, the shaft part being inserted through the axial fixing hole;

a slide part having a central sliding hole, one sliding jut at a first end thereof corresponding to a space between said two opposite fixing juts so as to fit with the fixing part, at least two end projections at a second end thereof, and a sliding groove on a circumferential side thereof corresponding to the fitting recess on the fixing part, the shaft part being inserted through the central sliding hole, each end projection having a sliding groove on lateral sides thereof;

an extension part being positioned between the fixing part and the slide part, the shaft part being inserted through the extension part; and a rotating part having a central rotating hole, two rotating projections corresponding to a space between the end projections, each rotating projection having a rotating slant at lateral sides thereof corresponding to the sliding groove, the shaft part being inserted through the central rotating hole;

a connecting part adjacent to the rotating part, the connecting part having a central connecting hole, a connecting recess corresponding to the sliding grooves respectively for being joined to a lid, and a plurality of insert jaws for connecting the rotating shaft assembly to the lid, the shaft part being inserted into the central connecting hole, such that when a lid rotates, the rotating slants on the rotating projections move along the end projections to allow the end juts to move along the fixing juts to compress the extension part between the fixing part and the slide part, which results in the rotating projections contacting face to face with the end projections, enabling the lid to be located at any angular position within a predetermined range of a flat faced surface, and when the rotating slants move to another slant side at another side of the respective end projection, the extension part stretches to allow the slide part to move back axially so that the rotating slants move along the end slants to form a state of engagement between the rotating slants and the end slants respectively and enable the lid to be fully opened.

2. The rotating shaft assembly according to claim 1, wherein the fixing juts on the fixing part are alternately disposed to the sliding juts on the slide part so that the fixing juts and the sliding juts can form a shape of cylinder as soon as the fixing part fits with the slide part.

3. The rotating shaft assembly according to claim 1, wherein the end projections on the slide part and the rotating projections on the rotating part provide a shape of sector respectively and the end projections are alternately disposed between the rotating projections to form a shape of cylinder as soon as the slide part fits with the rotating part.

4. The rotating shaft assembly according to claim 1, further comprises a decoration cover, which is disposed next to the fixing part, with preset cover recess for engaging with the projection area of the fixing part so as to block a connecting section of a main unit.

5. The rotating shaft assembly according to claim 1, wherein the extension part is a spring.

* * * * *